(12) United States Patent
Freitag et al.

(10) Patent No.: US 6,889,151 B2
(45) Date of Patent: *May 3, 2005

(54) METHOD AND DEVICE FOR CONDITIONING A PERIODIC ANALOG SIGNAL

(75) Inventors: Hans-Joachim Freitag, Jena (DE); Heinz-Gunther Franz, Hamburg (DE); Andreas Schmidt, Erfurt (DE)

(73) Assignee: Optolab Licensing GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/730,544

(22) Filed: Dec. 8, 2003

(65) Prior Publication Data

US 2004/0172208 A1 Sep. 2, 2004

Related U.S. Application Data

(63) Continuation of application No. 09/988,489, filed on Nov. 20, 2001, now Pat. No. 6,662,131.

(30) Foreign Application Priority Data

Nov. 20, 2000 (DE) .......................... 100 56 926

(51) Int. Cl.⁷ .......................... G06F 19/00; G01R 35/00
(52) U.S. Cl. .......................... 702/85; 702/66; 702/106; 702/107
(58) Field of Search .............................. 702/85, 87, 88, 702/106, 107, 124, 125, 126; 327/306, 307, 309; 375/317, 341, 377

(56) References Cited

U.S. PATENT DOCUMENTS 4,458,322 A * 7/1984 Veale ........................ 702/87

6,662,131 B2 * 12/2003 Freitag et al. .............. 702/106

* cited by examiner

Primary Examiner—Bryan Bui
(74) Attorney, Agent, or Firm—Jenkens & Gilchrist, P.C.

(57) ABSTRACT

A method is disclosed for conditioning a periodic analog signal (SIN, COS) to predetermined, positive and negative desired peak values by adjusting the signal (SIN, COS) using multiplicative correcting steps, which increase or decrease the signal amplitude, and additive correcting steps, adding to the signal a constant which adjusts the signal level in a positive or negative direction, wherein the presence of a current actual peak value is detected said method providing that the difference between the actual peak value and the predetermined desired peak value is stepwise reduced by repeated adjustment of the signal (SIN, COS) using modifying steps within a part of a period of the signal (SIN, COS), each modifying step including exactly one multiplicative and exactly one additive correcting step. A device is provided for carrying out the method, including an amplitude and offset adjusting device, to which the signal (SIN, COS) is supplied and which outputs said signal (SIN, COS) in amplified or attenuated form and with an increased or decreased signal level, respectively, at its output; a peak value detector, to which the signal (SIN, COS) is supplied and which outputs the previous actual peak value at its output until it is reset via a reset input, a reference voltage source, which is adjustable through a control input, and a control circuit, connected to the control input of the reference voltage source, which it adjusts in adjusting steps from a predetermined value, corresponding to the desired peak value, to the actual peak value which is output at the output of the peak value detector, and which stores the number and direction of the adjusting steps in two storage elements and then stepwise adjusts the amplitude and offset adjusting device simultaneously, depending on the stored number and direction.

26 Claims, 5 Drawing Sheets

METHOD AND DEVICE FOR CONDITIONING A PERIODIC ANALOG SIGNAL

This application is a continuation of U.S. Ser. No. 09/988,489 filed Nov. 20, 2001, now U.S. Pat. No. 6,662,131.

BACKGROUND OF THE INVENTION

1. Field of Invention

The invention relates to a method and a device for conditioning a periodic analog signal to predetermined positive and negative desired peak values.

2. Description of the Related Art

In position measurements, and in particular measuring distances, rotational speeds or angles of rotation, use is made of incremental measurement systems using sensors. Sensors provide two alternating periodic electrical signals being phase-displaced by 90° relative to each other. Signals of this type are also called orthogonal. The sensor usually senses a material measured, e.g. a marked code disk or a code ruler. The generated signals are in most cases of sinusoidal shape, but may also be triangular or trapezoidal in shape. For the sake of simplification, reference will be made in the following to sine and cosine signals. The amplitudes of sinusoidal signals in sensors or other devices vary, are age-dependent, depend on operating frequency, temperature, and supply voltage, and are subject to the influence of the material measured. These influences may lead to fluctuations in signal deviation, including fluctuations of signal amplitude. However, fluctuations in signal offset are also possible. Finally, signal phase deviations may also occur, in particular due to geometric or mechanical shift or changes in the sensor in connection with the scanned material measure.

In order to achieve synchronization in such incremental measurement systems, a synchronization signal is also provided in many cases which, due to its asymmetrical, periodic signal shape, enables a synchronization of the alternating signals to the material measure and thus a unique definition of a coordinate system.

Faulty electrical signals considerably limit the performance of such measurement systems and lead to errors in the detected distances, rotational speeds or angles of rotation.

A method for correcting the aforementioned fluctuations of amplitude is known from patent DE 38 43 108. The known method includes checking whether the positive and negative peak values of the sine and cosine signals have their peaks within a certain window. If this is not the case, the signal is corrected thereafter by suitable amplifications or by suitable additions. The type of correction is selected according to whether the signal is greater or less than the window, or to which correction was performed in the previous half-wave. Therefore, signal deviations from the window may require many periods for necessary conditioning. This may have an adverse effect on the first calibration upon power-on or even make necessary signal conditioning virtually impossible.

Patent EP 0,489,936 proposes a further improvement to the method described in patent DE 38 43 108, which reduces the circuitry overhead.

Patent application DE 197 12 622 describes an arrangement and a method for correcting erroneous signals in incremental measurement devices. For signal conditioning, a microprocessor is employed, which determines correcting factors in a closed loop in order to achieve higher precision.

The document "Die neue Dimension in der Weg- and Winkelmesstechnik", R. Burgschat, F & M, Feintechnik, Microtechnik, Microelektronik, Volume 10, 1996, discloses the use of digital potentiometers in an application specific integrated circuit (ASIC) for signal correction.

It is known from patent application DE 42 42 145 to correct a phase deviation of sinusoidal signals by summing and subtracting both signals to obtain further sinusoidal signals which no longer exhibit the statistic phase deviation, but have an exact phase shift of 90°.

Based upon the foregoing, there is a need for a technique which simply and effectively conditions periodic signals within a relatively short period of time.

SUMMARY OF THE INVENTION

Embodiments of the present invention overcome shortcomings in prior techniques and satisfy a significant need for conditioning a periodic analog signal to obtain predetermined positive and negative desired peak values, and allowing a correction to be obtained within few signal periods without utilization of a microprocessor.

According to exemplary embodiments of the present invention, the difference between the actual peak value of the periodic analog signal and a predetermined, desired peak value is stepwise reduced and compensated by repeated adjustment of the analog signal using modifying steps within a part of the period of the analog signal, with each modifying step including one multiplicative and one additive correcting step.

Upon detection of an actual peak value of the signal, the difference to the predetermined, desired peak value is no longer compensated stepwise over several periods by performing an adjusting step every half period of the analog signal, as seen in prior techniques. Rather, a multiplicity of adjusting steps are performed. Each adjusting step includes two correcting steps, namely one multiplicative correcting step, which increases or decreases the signal amplitude, and an additive correcting step, which adds a positive or a negative constant or offset to the signal, thus changing the signal level. Both correcting steps are carried out substantially simultaneously. This procedure offers the advantage of rapid signal conditioning.

Thus, with each adjusting step, the signal is changed in two respects. On the one hand, the signal is subjected to a multiplicative correction, on the other hand, to an additive correction. Both corrections are always performed in one single adjusting step. In general, the multiplicative and/or additive correcting steps are freely selectable, but may be fixed. The incremental procedure allows four different adjusting steps: an increasing, multiplicative correcting step in combination with an additive correcting step in a positive direction; an increasing multiplicative correcting step in combination with an additive correcting step in a negative direction; a reducing multiplicative correcting step in combination with an additive correcting step in a positive direction; and a reducing multiplicative correcting step in combination with an additive correcting step in a negative direction. The type of increasing step actually used conveniently depends on the position of the current actual peak value of the signal to be corrected relative to the predetermined desired peak value, and on the part of the period in which the actual peak value was detected. A change of the signal and a comparison of the actual peak value with the desired peak value are effected until no further conditioning is needed or an abort criterion is reached. The conditioning signal converges particularly fast towards the predetermined target values by selecting multiplicative and additive correcting steps according to the following table.

| Part of the period | Actual peak value compared to predetermined values | Modifying stop | |
|---|---|---|---|
| | | Multiplicative correcting step | Additive correcting step |
| positive | greater than desired peak value | +1 | −1 |
| positive | less than desired peak value | −1 | +1 |
| negative | greater than desired peak value | −1 | +1 |
| negative | less than desired peak value | +1 | −1 |

In this table, a positive/negative part of the period is understood to be a part of the period during which the signal is greater/less than zero. The figures "−1" and "+1" in the column of the multiplicative and the additive correcting step respectively indicate whether the step is an increasing or decreasing multiplicative step, or an additive correcting step in a positive or a negative direction.

Exemplary embodiments of the present invention are particularly easy to carry out if the frequency at which the stepwise modification is carried out is sufficiently high relative to the bandwidth of the signal to be corrected, because it may then be assumed that the signal value used for comparison with the desired peak value remains essentially unchanged when the modifications are performed.

If this requirement cannot be fulfilled, e.g. because rapidly changing signals are to be conditioned, the actual peak value is temporarily stored, e.g. in a peak value detector circuit having a sample-and-hold element for a comparison showing whether convergence has been achieved. Otherwise, the value of the signal would move too far away from the actual peak value during the sequence of modifying steps. Of course, this means that not only the signal must be changed by the modifying steps, but also the temporarily stored value used for the convergence comparison, because otherwise it could not be determined when convergence occurs between the actual peak value and the desired peak value. Consequently, the precision of the temporarily stored actual peak value and/or of the change of this actual peak value must meet certain requirements. In particular, deviations in the behavior between the temporarily stored actual peak value and the actual signal are disadvantageous.

Therefore, according to an exemplary embodiment of the present invention, after the actual peak value of the signal to be corrected is temporarily stored, a reference signal is stepwise adjusted from the predetermined desired peak value to the actual peak value stored, and the number of adjusting steps required is counted. The signal to be conditioned is then modified by the same number of modifying steps, the size of one modifying step corresponding to that of one adjusting step.

Thus, according to this exemplary embodiment of the present invention, a reference signal is stepwise adjusted from the desired peak value to the actual peak value and the required number of adjusting steps is counted. An adjusting step is selected such that it corresponds to a modifying step with respect to its size. Once the reference signal approaches the actual stored peak value of the signal, the signal to be conditioned is modified by the same number of modifying steps. Thus, for error detection according to this exemplary method, the reference voltage is first adjusted until convergence at the actual peak value stored. It is only then that a corresponding modification of the signal to be conditioned/corrected is carried out by performing error correction. Consequently, error detection and error correction are not performed at the same time. Moreover, since the reference signal is modified, the actual peak value may be easily stored even at high frequencies of the signal to be conditioned without the value having to be variable. It is particularly convenient to carry out the error correction at a low actual signal value, in particular at a zero crossing of the periodic signal being conditioned/corrected.

As mentioned above, storage of the actual peak values can be dispensed with if the modifying steps are carried out at a frequency that is greater than the signal bandwidth. The exemplary method then requires a smaller amount of circuitry.

If there are two signals to be conditioned that are orthogonal, i.e. phase-relative to each other by 90°, the presence of the peak value of a signal is detectable by the zero passage of the other signal.

Another exemplary embodiment of the present invention employs a reference signal for conditioning two orthogonal signals (referred to hereinafter as sine signal and cosine signals). Conditioning is such that, initiated by the zero crossing of the sine signal, the actual peak value of the cosine signal is compared with the reference signal, which is then stepwise approximated from the predetermined desired peak value to the actual peak value in equally dimensioned steps, until the cosine and reference signals are both substantially identical. The number and direction of the required adjusting steps for adapting the reference signal are counted and stored. Upon the occurrence of a zero crossing of the cosine signal, the same number of modifying steps, each including a multiplicative step and an additive correcting step, are stepwise applied to the cosine signal, so that this signal is suitably conditioned. The zero crossing of the cosine signal simultaneously initiates the above-described, stepwise adaptation of the reference voltage to the stored actual peak value of the sine signal.

On the one hand, this step-by-step operating mode has the advantage that, because the delay period between the adjustment of the reference signal and the comparison of the current reference signal value with the actual peak value (one clock period) is known, exact statements on the dynamic limits of the method are possible. Further, the detection of the zero crossing of one signal and the sampling of the actual peak value of the other signal is carried out at substantially the same time. Finally, an overshoot of the conditioning operation is avoided due to the error correction being carried out separately from the error detection.

Conveniently, the adaptation of the reference signal to the stored actual peak value is terminated only if the approximation has been achieved. Ideally, a maximum of two periods will be required for complete conditioning of a sine or cosine signal, regardless of the size of the signal error. However, it is also possible to abort after a certain time or a certain number of modifying steps.

However, for the conditioning of the analog signal to the desired peak value to reach convergence and, moreover, to require only a finite number of operations, the multiplicative and additive correcting steps should fulfill certain requirements. Otherwise, the aforementioned optimized conditions will not be present. It is particularly convenient that the increment of one adjusting step in error detection is possibly equal to the modifying step having a multiplicative and an additive correcting step in error correction. However, there is no need for complete equivalence because the operation is iterative and, thus, differences between error detection and error correction can occur. Only differences of more than approximately 50% between the adjusting step and the modifying step will result in a difference of one step at most. If the difference is less than approximately 50%, there will be no difference in the end because the values of the analog signal will be rounded off.

The use of the stored actual peak values instead of the instantaneous values of the sine and cosine signals preferably ensures substantially error-free functioning both for relatively low frequencies and for relatively high frequencies. For low frequencies, relatively precise detection the zero crossing of one signal allows for the peak value of the other signal to be determined. The normally-inevitable phenomena of self-discharge of hold capacitors used for storage of the signals is harmless in this case, because at low frequencies the output signal of the storage circuitry follows the input signal whose peak value is to be stored. The exact detection of the zero crossing is not a problem at low frequencies, since signal transitions are correspondingly slow and, consequently, negligible. At higher frequencies, however, the correct functioning of the actual peak value storage is ensured. The storage allows a substantially exact evaluation of the actual peak values even near a zero crossing, because there may be only a short period of time between the peak value and the zero crossing.

Thus, the use of the peak value detectors having a storage function automatically allows a relatively smooth transition between precisely timed sampling of the signal and imprecisely timed sampling of the stored actual peak values. Of course, in principle the method is limited in that only a predetermined number of modifying steps can take place within a part of a period at a predetermined stepping frequency. Even with the peak value detectors functioning ideally, the current adjusting operation is interrupted upon reaching the opposite actual peak value, in order to start the next adjusting operation. Consequently, the clock frequency of the adjusting steps should amount to about four times the signal frequency, thus allowing at least two adjusting steps to be carried out per part of a signal period.

Since a modifying step contains both a multiplicative and an additive correction and thus equally influence signal amplitude and offset, a relatively rapid convergence of the conditioning operation is ensured, except in cases of a pure offset error or a pure amplitude error. The product of the size of an adjusting step and of the number of possible steps within one part of the signal period determines the adjusting range possible within one part of the signal period.

Carrying out the error correction near a zero crossing of the signal, as provided according to an exemplary embodiment of the present, allows a relatively unnoticed tracking, in particular where the signal changes slowly, because, in a correction in or near the zero crossing, only the additive components of a modifying step will lead to changes in the value of the signal, but the multiplicative components in the zero crossing will not be relatively noticeable.

In addition to two orthogonal (sine and cosine) signals, a synchronization signal is also present in some measuring systems. The synchronization signal is periodic but asymmetrically periodic. The synchronization signal may be a gaussian pulse which occurs once with a certain period, i.e., except for its pulse, the synchronization signal is always equal to the negative peak value. Such synchronization signal may also be conditioned using the above-discussed method. It is assumed that the synchronization signal has a maximum positive peak substantially at a positive cross-over of the two orthogonal (sine and cosine) signals. However, at the adjacent cross-overs of the positive half-waves of the orthogonal signals, the negative peak value of the synchronization signal is present. The conditioning is then carried out in analogy to the conditioning of the orthogonal signals, by using the positive cross-over of the two orthogonal (sine and cosine) signals in the positive part of the period of the synchronization signal as the triggering event for determining the actual peak value thereof. Starting from substantially this point in time, the afore-described conditioning according to the exemplary embodiment of the present invention may be carried out for the case of adjusting the positive actual peak value. The cross-overs of the positive half-waves of the orthogonal (sine and cosine) signals, where the synchronization signal is located in the negative part of the period, may be used to initiate the correction of the synchronization signal to the negative desired peak value.

Advantageously, the exemplary method may also be applied to phase correction for signal conditioning of the orthogonal signals. To this end, the phase deviation resulting from the time relationship between the zero crossing of one signal and the peak value of the other signal is transformed into amplitude information, which is then detectable by a suitable amplitude comparison. This may be achieved by superimposing conditioned sine and cosine signal that have each been conditioned by a factor of $\sqrt{2}/2$, so that a new sinusoidal signal is generated. The difference between the actual peak value and the desired peak value of the sine or cosine signal is a measure of the error in the phase difference of the orthogonal signals. Conveniently, the comparison between the actual peak value of this auxiliary signal thus obtained and the desired peak value of the sine or cosine signal carried out according to the invention allows for obtaining the direction for incrementing a phase adjusting element, which may then be directly controlled. For an incremental phase displacement of one of the two sine or cosine signals for the purpose of correcting the phase relationship of both signals, one of the signals may be regarded as the reference signal, so that the phase correction needs to be carried out only on the other, namely the second signal. The reference signal may be selected at will.

The phase correction is particularly easily effected by superimposing a weighted portion of the reference signal on the remaining second signal by analog addition, so that the resulting signal has a modified phase location.

An exemplary embodiment of the present invention includes a device for conditioning a periodic analog signal to have values between predetermined, positive and negative desired peak values. The device includes an amplitude and offset adjusting device, to which the signal is supplied and which outputs a conditioned signal in amplified or attenuated form and with an increased or decreased signal level; a peak value detector, to which the signal is supplied and which outputs an actual peak value at an output until the detector is reset via a reset input; a reference voltage source, which is adjustable through a control input; and a control circuit, connected to the control input of the reference voltage source, for adjusting the reference voltage source in adjusting steps from a predetermined value corresponding to the desired peak value, to the actual peak value which is at the output of the peak value detector, and which stores the number and direction of the adjusting steps in two or more storage elements and then stepwise adjusts the amplitude and offset adjusting device simultaneously, depending on the stored number and direction.

The circuit, which serves in particular to carry out signal conditioning as described above, has the advantage that the circuit requires no expensive microprocessors but merely simple, relatively low-cost components. Further, the circuit has a modular structure because the elements used therein, namely the amplitude and offset adjusting device, peak value detector, reference voltage source and control circuit, may be provided in identical structures accordingly also for a plurality of analog signals to be conditioned.

In one implementation of the circuit, a reference comparator is provided that is connected to the output of the reference voltage source and to the peak value detector. The logic value at the output of the reference comparator indicates to the control circuit whether the signals applied to the inputs of the reference comparator are identical, i.e. whether the signal delivered by the reference voltage source has approached the actual peak values stored in the peak value detector.

If a circuit for conditioning two orthogonal signals is to be used, it is particularly convenient to provide a zero detector for each signal channel. The outputs of the zero detectors are then each connected to the control circuits of the other signal channel, so that a zero value in a signal channel detected by a zero detector indicates to the control circuit of the other signal channel the presence of a peak value in the other signal channel.

In one exemplary embodiment, a circuit is provided for signal conditioning three signals, two of which are orthogonal signals and a third signal being a synchronization signal as described above. The circuit for conditioning the synchronization signal includes an amplitude and offset adjusting device, a peak value detector, a zero detector, an adjustable reference voltage source, a control circuit and a level comparator to which the two orthogonal signals are supplied. The control circuit only sets the reference voltage source corresponding to the synchronization signal to the actual peak value provided by the peak value detector if the level comparator indicates the same level for both orthogonal signals. This embodiment also may have a modular structure with simple circuitry.

Embodiments of the present invention are not limited to the use for conditioning two orthogonal signals. It is understood that conditioning of a single signal is also possible, in which case the presence of a peak value must be detected in a suitable manner, e.g. by means of a gradient analysis.

BRIEF DESCRIPTION OF THE DRAWINGS

A more complete understanding of the exemplary embodiments of the present invention may be obtained by reference to the following Detailed Description when taken in conjunction with the accompanying Drawings wherein.

DETAILED DESCRIPTION OF EXEMPLARY EMBODIMENTS OF THE PRESENT INVENTION

The present invention will now be described more fully hereinafter with reference to the accompanying drawings in which exemplary embodiments of the invention are shown. This invention may, however, be embodied in many different forms and should not be construed as being limited to the embodiments set forth herein. Rather, the exemplary embodiments are provided so that this disclosure will be thorough and complete, and will fully convey the scope of the invention to those skilled in the art.

The method and circuit according to exemplary embodiments of the present invention will be described below wherein orthogonal sine and cosine signals are conditioned so as to have predetermined positive and negative desired peak values.

Figure 5:
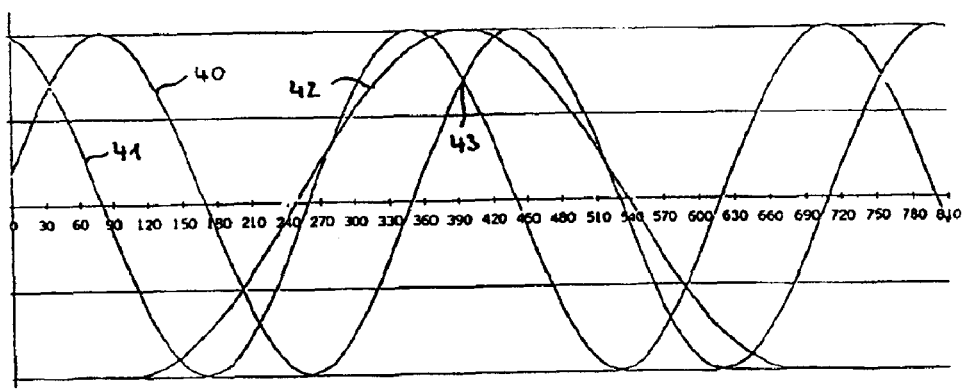
FIG. 5 is a waveform diagram illustrating a time-based sequence of sine, cosine and synchronization signals associated with the schematic of FIG. 1.

FIG. 5 shows time sequences of two signals 40 and 41. Signals 40 and 41 are orthogonal sine and cosine signals, respectively. The synchronization signal 42, also shown in the time sequence of FIG. 5, shall be separately discussed below. The signals 40, 41 may, for example, be obtained by scanning a code disk used in a system for measuring rotation angles. However, the origin of the signals 40, 41 is not very important. What is essential in the following description is the fact that they are orthogonal signals.

In order to be conditioned, the signals 40, 41 are passed through a circuit which delivers correspondingly conditioned signals at its output, i.e. signals adjusted to be within a predetermined range of values and to have predetermined desired maximum and minimum peak values. Moreover, in one of the exemplary embodiments described below, the conditioned signals delivered at the output of the circuit also have a special phase relation, i.e. the circuit also carries out a phase correction capability.

The following methods serve to set the conditioning values, which is briefly summarized by the term "conditioning".

In a first exemplary embodiment of the conditioning method, referred to below as a "tracking" method, the zero crossing of a signal is detected, which, for the sake of a simplified description, is signal 41 of FIG. 5. Due to the orthogonal nature of the signal 41 relative to the signal 40, the zero crossing of the signal 41 indicates that the signal 40 is located at the apex of the sine oscillation performed thereby. In the case of a phase difference deviating from the orthogonal relationship between signals 40 and 41, any phase error causes the signal 40 to be near the apex. This error is negligible due to the iterative nature of the exemplary method. Whether a positive or a negative part of a period or half-wave is present may be determined by simply checking the polarity of the signal 40. In the present case, it is a positive partial wave.

Once a zero crossing of the signal 41 has been found, the signal 40 is continually compared to the positive desired peak value, while the signal 40 is stepwise approached to the desired peak value. To this end, a modifying step is carried out in each of a plurality of steps, and then the modified signal is verified to determine whether the desired peak value has been reached.

Each modifying step is composed of an additive and a multiplicative correcting step, which are at least substantially simultaneously carried out. Thus, with each modifying step, the signal 40 is modified both in terms of its offset, due to the additive correcting step contained in the modifying step, and in terms of the signal amplitude, as a result of the multiplicative correcting step contained in the modifying step. Since the multiplicative and additive correcting steps may cause an increase or a decrease in the peak value and/or of the signal level, a total of four possible modifying steps may be used in any modifying step. The selection of the appropriate modifying step is derived from the Table above. FIG. 5 shows a modifying step composed of an amplifying multiplicative correcting step and an additive correcting step in a positive direction, since a positive part of a period is present and the value is below the actual peak value.

This step-by-step modification is then repeated within the period of the signal 40 until the desired peak value is obtained. Because relatively rapid convergence is desired, the clock frequency of the modifying steps is be comparable to the signal bandwidth of the signal to be conditioned, because it is at relatively higher speeds that an actual peak value of the signal to be conditioned is best seen to be capable of being compared with a desired peak value.

The next zero crossing of the signal 40 then causes a corresponding adjustment of the signal 41. In this case, the stepwise modifying steps are applied accordingly to signal 41.

Figure 7:
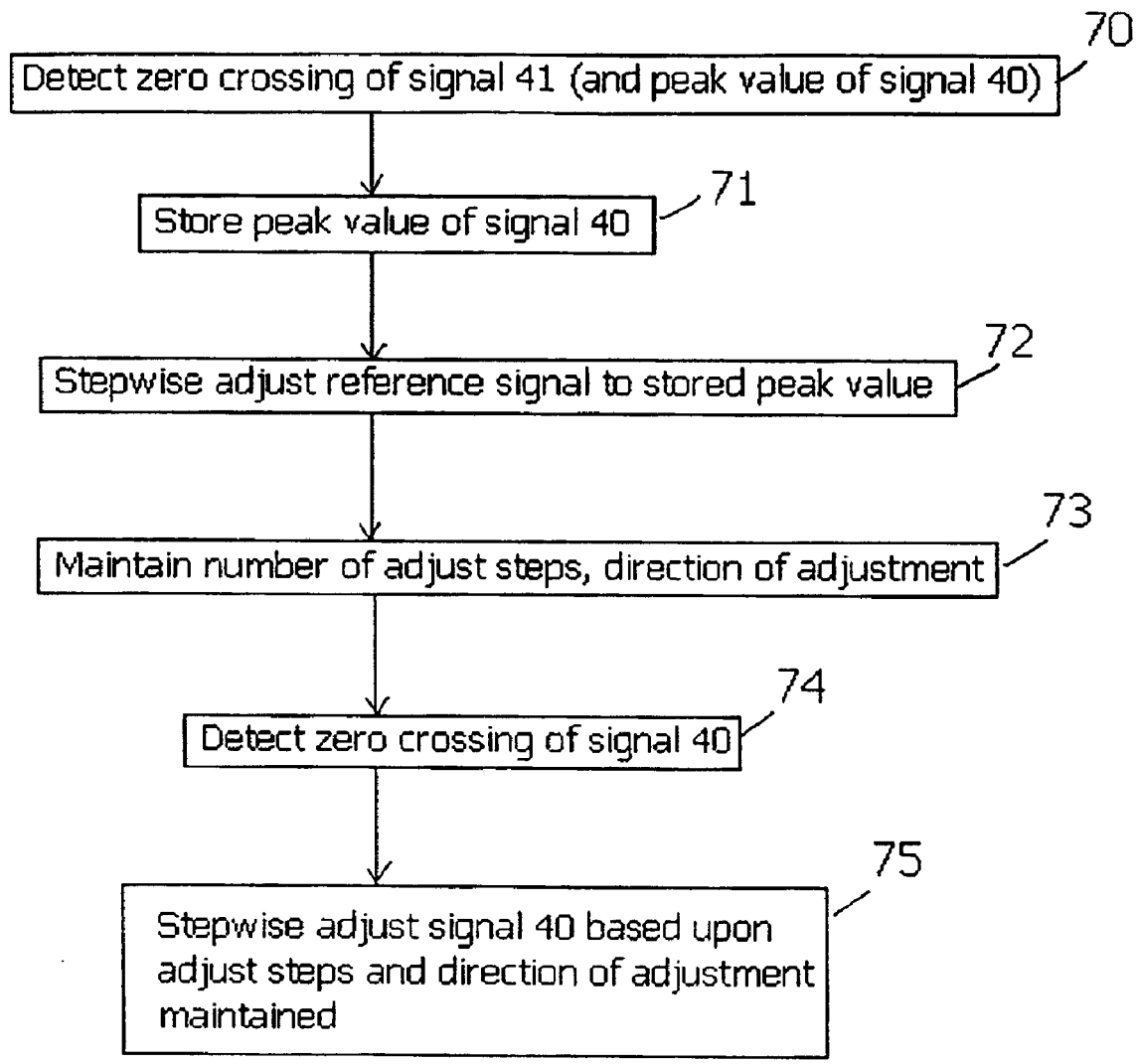
FIG. 7 is a flow chart illustrating an operation of the circuit of the signal conditioning circuit of FIG. 1.

In the event the clock rate at which the modifying steps are not carried out at a high enough frequency relative to the bandwidth of the signal, another exemplary embodiment of the method may be applied, which is referred to as the "compensation method". In the compensation method (FIG. 7), the actual peak value of the signal 40 is detected at 70 and then stored at 71 in a storage element, as in the case of the tracking method. Next, a reference signal corresponding to the positive desired peak value is adjusted at 72 to the stored actual peak value in a plurality of adjusting steps. The number of adjusting steps is detected and maintained by a counter at 73. The direction of the modifying steps are also detected. The modification of the reference signal from the desired peak voltage to the actual peak voltage is effected upon being triggered by the zero crossing of the signal 41, i.e. the zero crossing of the signal which is orthogonal to the signal whose actual peak value has been stored. This part of the method may be referred to as error detection.

At the subsequent zero crossing of the signal 40 at 74, the same number of modifying steps as are stored in the counter is then carried out on signal 40, i.e. a number of modifying steps equal to the number of adjusting steps required in the error detection previously performed is carried out on signal 40 at 75. The increment provided by and carried out with each modifying step essentially equals the increment provided by and carried out with one adjusting step. The way in which the modifying steps are composed of the aforementioned multiplicative and additive correcting steps results, on the one hand, from the part of the period in which the signal 40 is located. In the present case, this is the positive half period. On the other hand, the direction in which the reference signal had to be adjusted to the actual peak value is taken into consideration. The direction indicates whether the actual peak value was below or above the desired peak value. Thus, the relationship expressed in the above-mentioned Table applies again.

To correct the synchronization signal 42, use is made of the fact that the maximum of this signal should be located exactly at the cross-over of the orthogonal signals 40 and 41. The adjustment of the conditioning operation is thus triggered for the synchronization signal 42 precisely as soon as the signals 40 and 41 cross-over at 43 shown in FIG. 5 and the signal 42 is located in the positive part of the period. To this end, either the tracking method or the compensation method may be carried out. The compensation of the negative actual peak values of the synchronization signal 42 is possible at any point in time during the negative part of the period, due to the asymmetry of the synchronization signal. However, it is also particularly convenient in this case to use a cross-over of the signals 40 and 41 to trigger the compensation method, because this will ensure that the synchronization signal 42 lies at the negative actual peak value in the negative half period.

Another exemplary embodiment allows conditioning with regard to a phase correction. To this end, an auxiliary signal is generated from whose amplitude information the phase displacement can be read. The conditioned signals 40, 41 are multiplied with a factor of $\sqrt{2}/2$ and then superimposed, so that a new, sinusoidal signal is generated. The difference between the actual peak value of the auxiliary signal and the desired peak value of the output signals is a measure for the phase difference between the signals 40 and 41.

Figure 6:
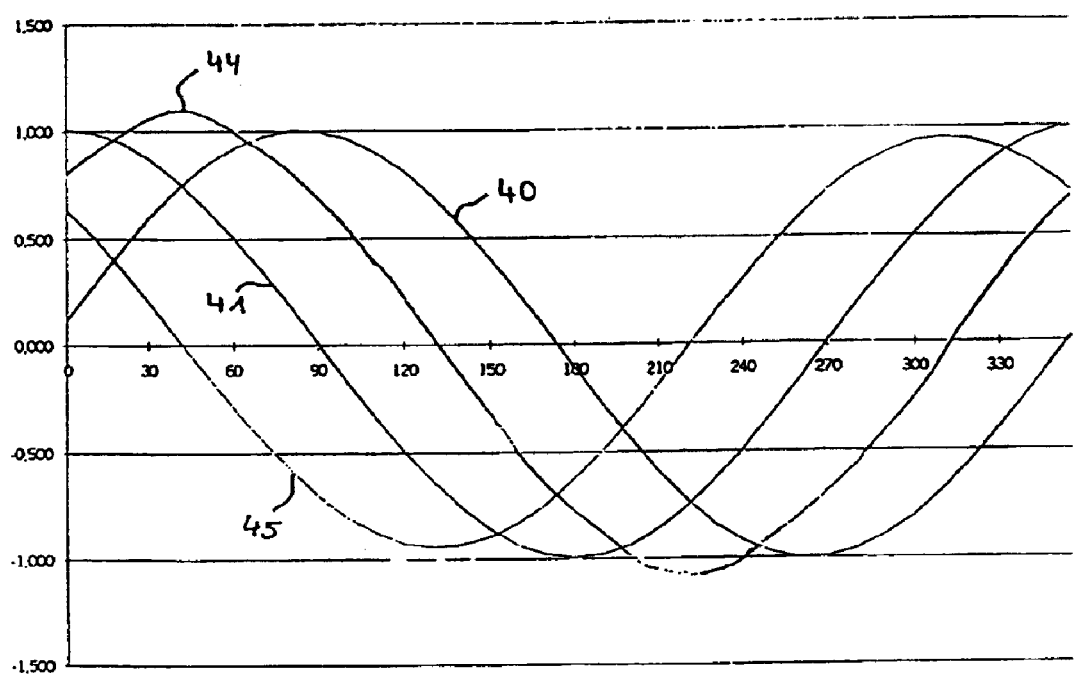
FIG. 6 is a waveform diagram illustrating a time-based sequence of auxiliary signals used for phase-difference correction by the schematic of FIG. 1.

The comparison of the actual peak value of this auxiliary signal with the desired peak then carried out in the same manner as in the tracking method or in the compensation method. At the same time, this comparison also provides the direction in which the phase difference must be corrected. These signals are shown in FIG. 6, wherein the auxiliary signal indicated at 44 was obtained by addition of sine and cosine, and the auxiliary signal 45 by a corresponding subtraction. Both auxiliary signals may be alternatively used, because their absolute difference between actual peak value and desired peak value is equal, so that only the mathematical sign has to be considered accordingly in the direction of the phase correction.

By introducing an additional phase shift, either for the signal 40 or for the signal 41, the corresponding phase correction may be achieved. For correction, one of the two signals 40 or 41 may be randomly chosen as a reference signal, to which the other signal must be phase adjusted. The direction of the adjustment is indicated by the comparative result of the auxiliary signal.

Figure 1:
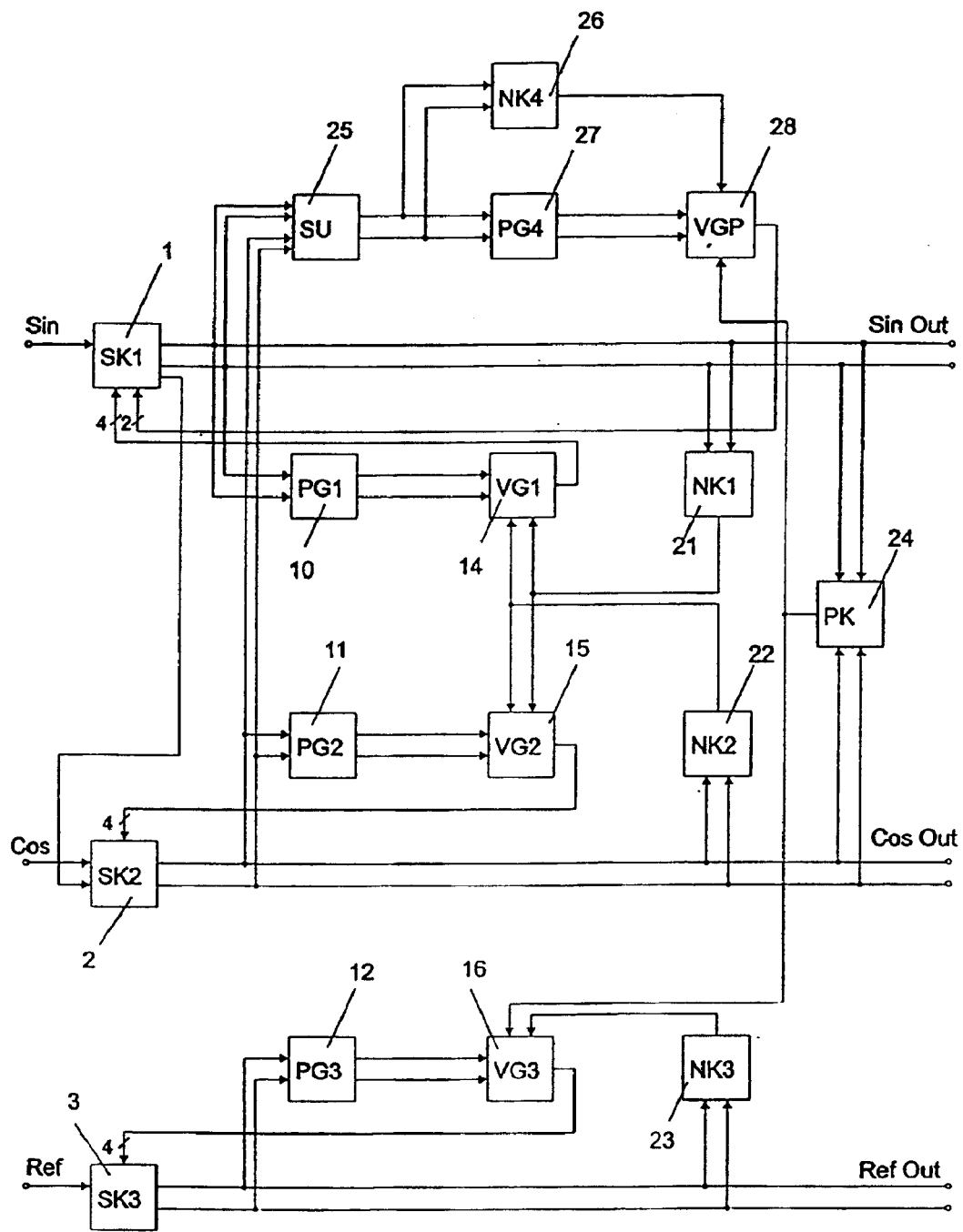
FIG. 1 is a schematic of a multiple-channel signal conditioning circuit according to an exemplary embodiment of the present invention.

FIG. 1 shows circuitry suitable to carry out the compensation method. It consists of three signal processing channels 1, 2 and 3 (SK1, SK2 and SK3) of substantially identical structure. Channels SK1–SK3 amplify or attenuate the respective input signal and offset the signal level. In the channels SK1, SK2 and SK3, the respective input signal 40, 41 is adjusted to predetermined positive and negative desired peak values. The channels 1 and 2 (SK1 and SK2) serve to process the two sinusoidal signals, also referred to in the Figures as Sin and Cos. Channel 3 (SK3) processes the synchronization signal 42, which is referred to in the Figures as Ref.

Figure 2:
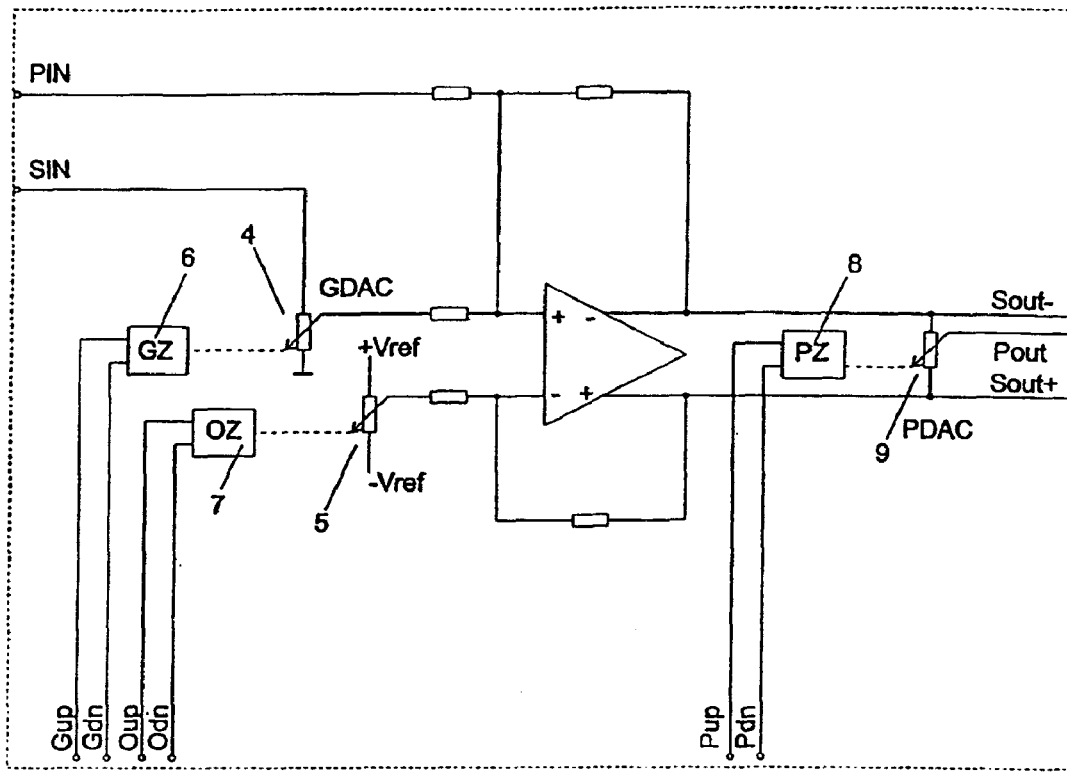
FIG. 2 is a schematic of a circuit block shown in FIG. 1.

Each channel (SK1, SK2, SK3) is designed as shown in FIG. 2. The channel circuitry selectively provides amplification that is adjustable in increments within certain limits (gain position) according to signals at digital inputs Gup (gain-up) and Gdn (gain-down). The channel circuitry further selectively provides an offset of the signal level (offset position) that is adjustable in increments within certain limits, according to digital input signals Oup (offset-positive) and Odn (offset-negative). Signals Gup, Gdn, Oup and Odn may be, for example, control pulses. For each incoming input pulse, the amplification and/or the offset is adjusted by one increment each in the associated direction, i.e. up (up) or down (dn).

The gain-adjusting and offset-adjusting elements are advantageously realized by potentiometer-based D/A converters 4, 5 (GDAC, ODAC, respectively). Converters 4 and 5 are controlled by up/down counters 6 (GZ) and 7 (OZ), respectively. Together with the potentiometer-based D/A converter 9 (PDAC), a counter 8 (PZ) provides a part of the output voltage, which is controllable with respect to polarity and size. The input signal is applied to the input SIN. At the input PIN, a further signal may be applied, which can be additively superimposed on the output signal.

The differential outputs of each channel (SK1, SK2, SK3) has a respective precision peak value rectifier 10, 11, 12 (PG1, PG2, PG3) connected to it, which stores the positive and/or negative peak value of the signal voltage at the output of the respective channel as an analog voltage for a period of time up to the subsequent zero crossing. An input is provided for resetting (not shown).

Figure 3:
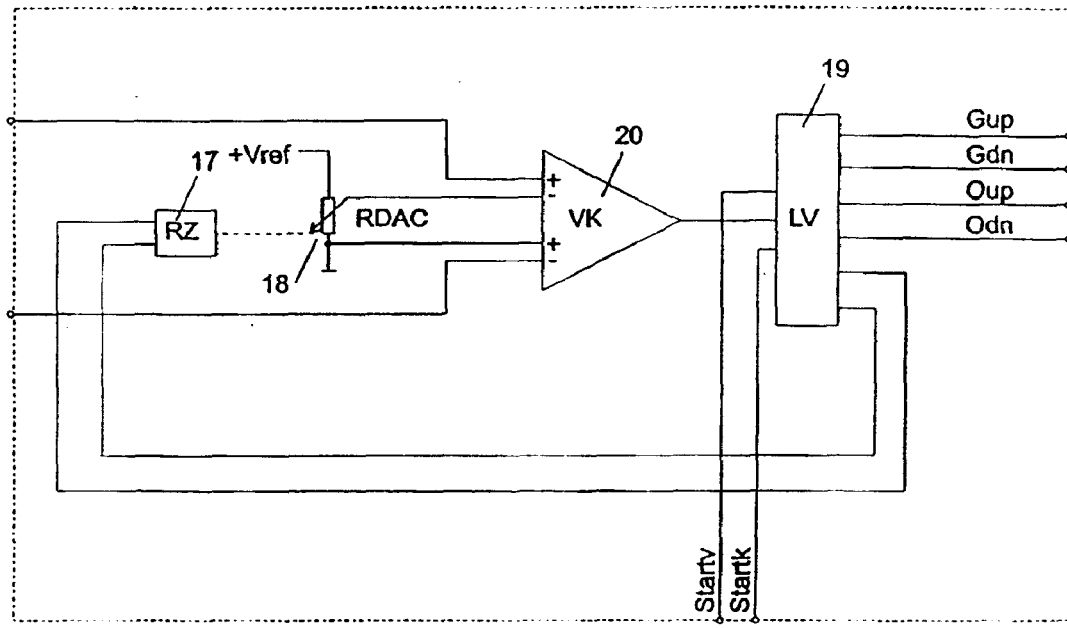
FIG. 3 is a schematic of another circuit block shown in FIG. 1.

Three comparing circuits 14, 15 and 16 (VG1, VG2 and VG3, respectively) are designed as shown in FIG. 3 and compare the output voltages of the precision peak value rectifiers 10, 11 and 12, respectively, with a reference voltage that is incrementally adjustable. This comparison is effected in a manner synchronized by a clock signal applied to a clock input (not shown). The adjustable reference voltage used for comparison is advantageously realized by a counter 17 (RZ) and a potentiometer-based D/A converter 18 (RDAC). A pulse edge at the input Startv of the comparing circuit triggers a stepwise approximation of the reference voltage of the precision rectifier 10, 11, 12, starting from a defined desired value of the reference voltage, which corresponds to the middle position of the D/A converter 18 (RDAC) or to the zero count of the counter 17 (RZ). The logic circuit 19 (LV) increments or decrements the counter 17 (RZ) with each clock after the pulse at Startv as a function of the logic value at the output of the reference comparator 20 (VK). This is done until the output of the reference comparator 20 (VK) changes its logic value. Together with the pulse at Startv, the logic circuit 19 (LV) also stores the logic value at the input Startv as polarity information. On the basis of the current position of the counter 17 (RZ), a pulse edge at the input Startv triggers the decrementing or incrementing of the counter, which is carried out until the zero count is reached. The counting pulses required are directed to one of the outputs Gup or Gdn and to one of the outputs Oup or Odn depending on the counting direction and the stored polarity Information.

Three zero voltage comparators 21, 22 and 23 (NK1, NK2, NK3) and one level comparator 24 (PK) detect the levels within the channels and, together with a clock generator (not shown here), generate the control pulses Startv and Startv for triggering the comparing and adjusting operations of the error detection and error correction phases.

Once the zero voltage comparator 21 (NK1) detects the zero crossing of the sine signal in channel 1, the input Startv of the comparing circuit 15 (VG2) receives a pulse, by which the process of error detection in the signal channel 2 starts. The clocked operation of adapting the reference voltage to the value stored by the precision rectifier 11 (PG2) is terminated as soon as the output of the reference comparator 20 of comparing circuit 15 switches over, i.e. as soon as the incremented reference voltage has reached the value of the output voltage of the precision rectifier PG2. The count of the counter RZ2 17 at the end of the operation represents the difference of the actual peak value of the signal in channel 2 to the desired peak value in the form of the number of adjusting steps.

If the zero voltage comparator 22 (NK2) detects only one zero crossing of the cosine signal in channel 2, the Startv input of the comparing circuit 15 (VG2) receives a pulse, which starts the process of error correction in signal channel 2, wherein the counter 17 (RZ2) is counted to zero in the opposite direction relative to the counting operation during the process of error detection. The clock pulses required by channel circuitry 2 (SK2) are simultaneously fed to the inputs Gup or Gdn and Oup or Odn of the signal channel SK2, so that gain and offset are modified therein. The direction of the modification (up or down) is obtained by combining the counting direction of the counter 17 (RZ2) with the polarity of the most recently detected actual peak value of the signal voltage in channel 2 so that this actual peak value approaches the desired peak value.

Substantially simultaneously with this process of error correction in channel 2, the process of error detection in channel 1 is started (and vice versa).

At higher signal frequencies and, at the same time, large signal offsets, the length of a quarter of a period, from the zero crossing of one signal to the zero crossing of the other may no longer be sufficient for error detection, i.e. for the full approximation of the reference voltage to the output voltage of the precision rectifier. In such a case, the error detection in one channel is terminated at the zero crossing of the other signal and error correction follows directly. Only a partial correction is therefore achieved. The compensation operation then requires several periods for a full correction, depending on the relation between the signal frequency and the clock frequency.

The signal voltage in channel 3 is the above-mentioned synchronization signal, which is not sinusoidal, but also has positive and negative peak values that are adjustable to a defined value and symmetric about the zero reference voltage. The only difference in the correction process is the manner in which the starting pulse Startv for channel 3 is generated.

If the zero voltage comparators 21 and 22 (NK1 and NK2, respectively) detect positive signal levels in both channels and the level comparator 24 (13K) indicates that the signals in channel 1 and channel 2 are substantially identical, the input Startv of the comparing circuit 16 (VG3) receives a pulse, which starts the process of error detection in signal channel 3. The clocked error detection operation of adjusting the reference voltage of the comparing circuit 16 (VG3) to the value stored by the associated precision rectifier 12 (PG3) is terminated when the output of the comparator switches over, i.e. when the incremented reference voltage has reached the value of the output voltage of the precision rectifier 12 (PG3). The count of the counter 17 (RZ3) in comparing circuit 16 (VG3) at the end of the operation represents the difference between the peak value of the signal in channel 3 and the desired value in the form of a number of increments.

The process of error correction in channel 3 starts if the zero voltage comparator 23 (NK3) detects a zero crossing of the signal in channel 3, with the counter 17 (RZ3) counting to zero in the opposite direction relative to the counting operation of the process of error detection in channel 3. The clock pulses required by channel 3 circuitry 3 (SK3) are simultaneously fed to the inputs Gup or Gdn and Oup or Odn of the channel circuitry 3 (SK3) so that gain and offset are adjusted in channel 3. The direction of this adjustment (up or down) is obtained by combining the counting direction of the counter 17 (RZ of SK3) with the polarity of the previously detected peak value of the signal voltage in channel 3 so as to approximate its actual peak value to the desired peak value.

Figure 4:
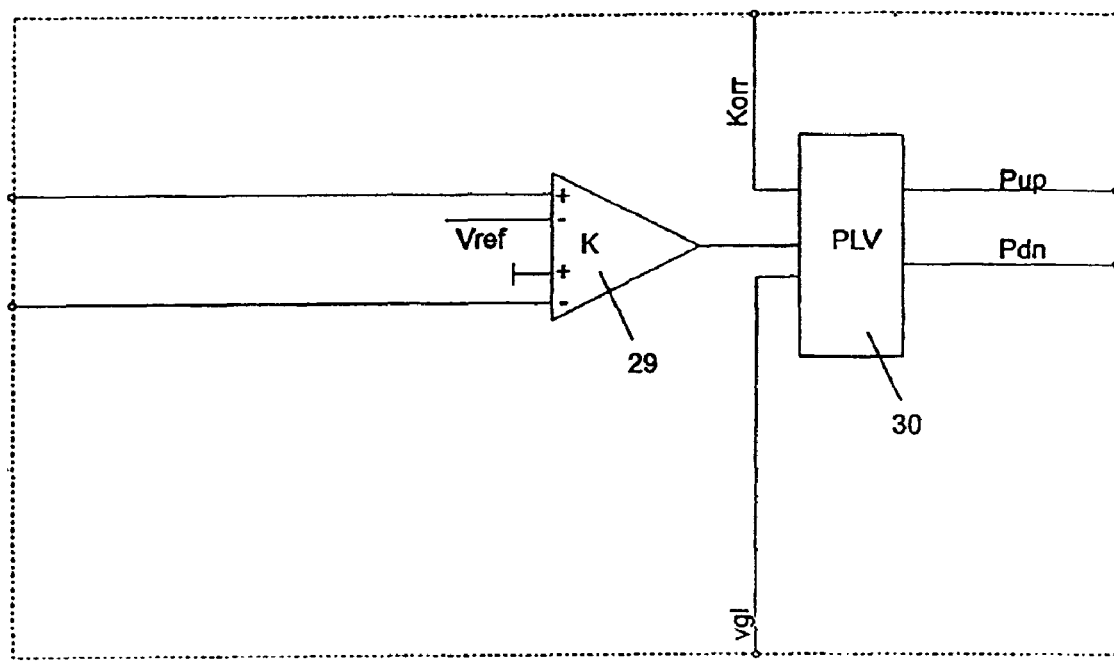
FIG. 4 is a schematic of yet another circuit block shown in FIG. 1.

For phase correction, an additional circuit for obtaining an auxiliary signal is provided. This auxiliary signal is generated by analog addition of the signals of channels 1 and 2 and by attenuation of the sum signal by the factor 0.71 (approx. equal to $\sqrt{2}/2$) in the adding circuit 25 (SU). A zero comparator 26 (NK4), a peak value rectifier 27 (PG4) and a comparing circuit 28 (VGP) are connected to the adding circuit 25 (SU). As shown in FIG. 4, the comparing circuit 28 (VGP) includes a voltage comparator 29 (K), whose initial condition in the case of an edge at the input signal vgl is transferred to the logic circuit 30 (PLV) as directional information. In the case of an edge at the input korr, a pulse is output to Pup or Pdn, depending on the previously stored directional information. These pulses are fed to the counter 8 (PZ) of the signal channel 1, which directs part of the output signal of channel 1 via the potentiometer-based D/A converter 9 of channel circuitry 1 (SK1) to the output POUT thereof. This voltage is fed to the input PIN of the signal channel 2 (SK2) and causes a phase shift of the output signal of channel 2 by superposition. By limiting the range of the correcting steps during the phase correction to one increment each, an uncoupling of the closed-loop control operations for amplitude and offset correction, on the one hand, and phase correction, on the other hand, is obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for conditioning a periodic analog signal to have positive and negative desired peak values, comprising:
   detecting a peak value of the periodic analog signal; and
   sequentially performing signal correction in a portion of a single period of the periodic analog signal to reduce a difference between the detected peak value and a desired peak value in a stepwise manner, the signal correction comprising:
   multiplicative correcting by modifying the amplitude of the periodic analog signal; and
   additive correcting by adding to the periodic analog signal a constant that changes the offset of the periodic analog signal in a positive or negative direction.

2. The method as claimed in claim 1 wherein the signal correction comprises:
   multiplicative correcting to amplify the periodic analog signal in a positive direction, and additive correcting to provide a signal offset to the periodic analog signal in a negative direction if the detected peak value is greater than the desired peak value within a positive part of a period of the periodic analog signal;
   multiplicative correcting to amplify the periodic analog signal in a negative direction, and additive correcting to provide a signal offset to the periodic analog signal in a positive direction if the detected peak value is less than the desired peak value within a positive part of a period of the periodic analog signal;
   multiplicative correcting to amplify the periodic analog signal in a negative direction, and additive correcting to provide a signal offset to the periodic analog signal in a positive direction if the detected peak value is greater than the desired peak value within a negative part of a period of the periodic analog signal; and
   multiplicative correcting to amplify the periodic analog signal in a positive direction, and additive correcting to provide a signal offset to the periodic analog signal in a negative direction if the detected peak value is less than the desired peak value within a negative part of a period of the periodic analog signal.

3. The method as claimed in claim 1, wherein the sequence of signal correction is carried out at a frequency which is greater than the bandwidth of the periodic analog signal.

4. The method as claimed in claim 1, further comprising temporarily storing the detected peak value of the periodic analog signal.

5. The method as claimed in claim 1, further comprising:
   detecting a zero crossing of a second periodic analog signal that is approximately 90 degrees out of phase relative to the periodic analog signal, the signal correction being performed following the detection of a zero crossing of the second periodic analog signal.

6. The method as claimed in claim 5 wherein the periodic analog signal and the second periodic analog signal are sinusoidal signals such that the zero crossing of the second periodic analog signal substantially occurs when the periodic analog signal is at a peak value.

7. The method as claimed in claim 1, wherein multiplicative correcting and additive correcting of signal correction occur at substantially the same time.

8. A method for conditioning a periodic analog signal to have positive and negative desired peak values, comprising:
   detecting a peak value of the periodic analog signal;
   selectively adjusting a reference signal in a stepwise manner from the desired peak value to approximately the detected peak value; and
   sequentially performing signal correction in a portion of a period of the periodic analog signal to reduce a difference between the detected peak value and a desired peak value in a stepwise manner, the signal correction comprising:
   multiplicative correcting by modifying the amplitude of the periodic analog signal; and
   additive correcting by adding to the periodic analog signal a constant that changes the offset of the periodic analog signal in a positive or negative direction;
   wherein a number of adjusting steps equals a number of signal correction steps, the periodic analog signal being modified in each signal correction step substantially the same as the reference signal is adjusted in each corresponding adjusting step.

9. The method of claim 8, wherein the sequence of signal correction is performed in a portion of a single period of the periodic analog signal.

10. A device, comprising:
    a signal adjusting circuit that selectively amplifies a received first periodic analog signal and selectively generates a signal offset thereto; and
    a comparison circuit that compares a peak value of the first periodic analog signal to an adjustable reference signal, and generates control signals based upon the comparison that control operation of the signal adjusting circuit to adjust received first periodic analog signal in each of a plurality of sequenced steps which occur within a portion of a single period of the periodic analog signal.

11. The device of claim 10, further comprising:
    a peak value detector connected between the signal adjusting circuit and the comparison circuit that maintains a peak value of the output of the adjusting circuit until the peak value detector is reset.

12. The device of claim 10, wherein the comparison circuit comprises:

an adjustable reference source that generates the adjustable reference signal as an analog signal, the compare circuit adjusting the adjustable reference signal in sequential stepped levels between a predetermined value corresponding to a desired peak value and a peak value of the first periodic analog signal.

13. The device of claim 12, wherein the compare circuit comprises:

one or more storage elements that maintain one or more values corresponding to a number of stepped levels utilized in adjusting the reference signal.

14. The device of claim 13, wherein the signal adjusting circuit adjusts the amplitude and offset of the first periodic analog signal in a stepped manner based upon the values maintained in the one or more storage elements.

15. The device of claim 10, further comprising:

a second signal adjusting circuit to which a second periodic analog signal is supplied and which selectively amplifies the second periodic analog signal and selectively provides a signal offset thereto; and a second comparison circuit coupled to an output of the second adjusting circuit for comparing a peak value of the second periodic analog signal to a second adjustable reference signal, the compare circuit generating control signals that are based upon the comparison for controlling the second adjusting circuit so that the second periodic analog signal is adjusted by the second adjusting circuit in each of a plurality of steps, the plurality of steps occurring within a portion of the second periodic analog signal.

16. The device of claim 15, further comprising:

a zero detection circuit for receiving the first and second periodic analog signals, wherein the first and second periodic analog signals are approximately 90 degrees out of phase with each other, the signal adjusting circuit and the comparison circuit condition the first periodic analog signal upon the zero detection circuit detecting the second periodic analog signal crossing a zero reference, and the second signal adjusting circuit and the second comparison circuit condition the second periodic analog signal upon the zero detection circuit detecting the first periodic analog signal crossing the zero reference.

17. The device of claim 15, further comprising:

a third signal adjusting circuit to which a third periodic analog signal is supplied and which selectively amplifies the third periodic analog signal and selectively provides a signal offset thereto;

a third comparison circuit coupled to an output of the third adjusting circuit for comparing a peak value of the third periodic analog signal to a third adjustable reference signal, the compare circuit generating control signals that are based upon the comparison for controlling the third adjusting circuit so that the third periodic analog signal is adjusted by the third adjusting circuit in a stepwise manner.

18. The device of claim 17, further comprising:

a level comparator circuit for comparing the first and second periodic analog signals and indicating when the first and second periodic analog signals are substantially the same, the third signal adjusting circuit and the third comparison circuit being initiated to adjust the third periodic analog signal by the level comparator.

19. The device of claim 15, further comprising:

phase correcting circuitry for adjusting a phase difference between the periodic analog signal and the second periodic analog signal, comprising circuitry for generating an auxiliary signal based upon the periodic analog signal and the second periodic analog signal and for incrementally displacing the phase between the periodic analog signal and the second periodic analog signal based upon the auxiliary signal.

20. A method, comprising:

performing a sequence of error detection operations on a reference signal in a stepwise manner during a portion of a period of a periodic analog signal so that the reference signal is adjusted from a predetermined level to a peak level of the periodic analog signal; and performing a sequence of error correction operations on the periodic analog signal in a stepwise manner during a portion of a period of the periodic analog signal so that the periodic analog signal is modified to be within a predetermined range of levels, each error correction operation comprising:

amplifying the periodic analog signal; and offsetting to the periodic analog signal during the time the periodic analog signal is being amplified, wherein an equal number of error correction and error detection operations are performed, and each error detection operation similarly adjusts the reference signal and the periodic analog signal.

21. The method of claim 20, wherein the error detection operations are performed on the reference signal prior to the error correction operations being performed on the periodic analog signal.

22. The method of claim 20, wherein the sequence of error detection operations are performed during a portion of a single period of the periodic analog signal.

23. A device, comprising:

an adjusting circuit that selectively amplifies a first periodic analog signal and selectively provides a signal offset thereto;

a compare circuit that compares a peak value of the first periodic analog signal to an adjustable reference signal and generates control signals based upon the comparison to control the adjusting circuit so that the first periodic analog signal is adjusted in each of a plurality of steps which occur within a portion of a period of the periodic analog signal;

wherein the compare circuit comprises an adjustable reference source that generates the adjustable reference signal as an analog signal, the compare circuit adjusting the adjustable reference signal in sequential stepped levels between a predetermined value corresponding to a desired peak value and a peak value of the first periodic analog signal; and one or more storage elements for maintaining one or more values corresponding to a number of stepped levels utilized in adjusting the reference signal.

24. A device, comprising:

a first adjusting circuit that selectively amplifies a first periodic analog signal and selectively provides a signal offset thereto;

a first compare circuit that compares a peak value of the first periodic analog signal to an adjustable reference signal and generates control signals based upon the comparison to control the adjusting circuit to adjust the first periodic analog signal in each of a plurality of steps which occur within a portion of a period of the periodic analog signal;

a second adjusting circuit that selectively amplifies a second periodic analog signal and selectively provides a signal offset thereto;

a second compare circuit that compares a peak value of the second periodic analog signal to a second adjustable reference signal and generates control signals based upon the comparison to control the second adjusting circuit to adjust the second periodic analog signal in each of a plurality of steps which occur within a portion of the second periodic analog signal;

a third adjusting circuit that selectively amplifies a third periodic analog signal and selectively provides a signal offset thereto;

a third compare circuit that compares a peak value of the third periodic analog signal to a third adjustable reference signal and generates control signals based upon the comparison to control the third adjusting circuit to adjust the third periodic analog signal in a stepwise manner; and a level comparator circuit that compares the first and second periodic analog signals and indicates when the first and second periodic analog signals are substantially the same, the third adjusting circuit and the third compare circuit being initiated to adjust the third periodic analog signal by the level comparator.

25. A device, comprising:

a first adjusting circuit that selectively amplifies a first periodic analog signal and selectively provides a signal offset thereto;

a first compare circuit that compares a peak value of the first periodic analog signal to an adjustable reference signal and generates control signals based upon the comparison to control the adjusting circuit to adjust the first periodic analog signal in each of a plurality of steps occurring within a portion of a period of the periodic analog signal;

a second adjusting circuit that selectively amplifies a second periodic analog signal and selectively provides a signal offset thereto; and a second compare circuit that compares a peak value of the second periodic analog signal to a second adjustable reference signal to generate control signals based upon the comparison to control the second adjusting circuit to adjust the second periodic analog signal in each of a plurality of steps occurring within a portion of the second periodic analog signal; and phase correcting circuitry that adjusts a phase difference between the first periodic analog signal and the second periodic analog signal by generating an auxiliary signal based upon the first periodic analog signal and the second periodic analog signal and incrementally displacing the phase between the first periodic analog signal and the second periodic analog signal based upon the auxiliary signal.

26. The device of claim 25, wherein the plurality of steps are performed during a portion of a single period of the periodic analog signal.

* * * * *